(12) United States Patent
Taylor et al.

(10) Patent No.: US 8,445,783 B2
(45) Date of Patent: May 21, 2013

(54) SPLICE ASSEMBLY WITH SHIELD SOCK

(75) Inventors: William L. Taylor, Austin, TX (US); Carl J. Wentzel, Austin, TX (US); Kim P. Mulvey, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 478 days.

(21) Appl. No.: 12/698,791

(22) Filed: Feb. 2, 2010

(65) Prior Publication Data

US 2010/0193235 A1    Aug. 5, 2010

Related U.S. Application Data

(60) Provisional application No. 61/150,047, filed on Feb. 5, 2009.

(51) Int. Cl.
*H02G 15/02* (2006.01)

(52) U.S. Cl.
USPC ............ 174/93; 174/84 R; 174/75 R; 174/78; 174/88 R (58) Field of Classification Search
USPC .................... 174/84 R, 75 R, 78, 88 R, 93
See application file for complete search history.

(56) References Cited

U.S. PATENT DOCUMENTS

| | | |
|---|---|---|
| 3,717,717 A | 2/1973 | Cunningham et al. |
| 4,389,440 A | 6/1983 | Keith |
| 4,503,105 A | 3/1985 | Tomioka |
| 4,935,464 A | 6/1990 | Ona et al. |
| 5,061,208 A | 10/1991 | Bixler |
| 5,087,492 A | 2/1992 | Vallauri et al. |
| 5,365,020 A | 11/1994 | Vallauri et al. |
| 5,495,650 A | 3/1996 | Crepel et al. |
| 5,577,310 A | 11/1996 | Cheenne-Astorino et al. |
| 5,589,667 A | 12/1996 | Tsukazaki et al. |
| 5,747,744 A | 5/1998 | Kraft et al. |
| 5,756,936 A | 5/1998 | Viebranz et al. |
| 5,821,459 A | 10/1998 | Cheenne-Astorino et al. |
| 6,080,101 A | 6/2000 | Tatsuno et al. |
| 6,103,975 A | 8/2000 | Krabs et al. |
| 6,111,200 A | 8/2000 | DeSchrijver et al. |
| 6,506,975 B2 * | 1/2003 | De Buyst ................. 174/88 R |
| 6,838,512 B2 | 1/2005 | Eggers et al. |
| 6,963,031 B2 * | 11/2005 | Gladfelter et al. ........ 174/74 A |

(Continued)

FOREIGN PATENT DOCUMENTS

| | | |
|---|---|---|
| EP | 0500216 A2 | 8/1992 |
| EP | 0966780 B1 | 3/2002 |
| WO | WO 95/11542 | 4/1995 |
| WO | WO 99/21259 | 4/1999 |
| WO | WO 03/028182 | 4/2003 |
| WO | WO 2006/002650 A1 | 1/2006 |

*Primary Examiner* — Jayprakash N Gandhi
*Assistant Examiner* — Dion Ferguson
(74) *Attorney, Agent, or Firm* — Melanie G. Gover (57) ABSTRACT

An assembly is provided that includes a tubular support core, a splice body configured to circumferentially surround the support core, a conductive shield sock comprising at least two overlapping layers and configured to circumferentially surround the splice body and a cold shrink jacket circumferentially surrounding the shield sock. The ends of the shield sock are located beneath the cold shrink jacket and the shield sock extends beyond both ends of the splice body. In some embodiments the shield sock includes folded portions that extend beyond the ends of the splice body.

15 Claims, 8 Drawing Sheets

U.S. PATENT DOCUMENTS

| | | |
|---|---|---|
| 7,351,908 B2 | 4/2008 | Wentzel et al. |
| 7,476,114 B1 * | 1/2009 | Contreras ................. 439/201 |
| 7,511,222 B2 | 3/2009 | Taylor et al. |
| 7,670,197 B2 | 3/2010 | Janulis et al. |
| 2002/0040803 A1 | 4/2002 | Buyst |
| 2004/0262025 A1 | 12/2004 | Brandt et al. |
| 2008/0135288 A1 | 6/2008 | Taylor et al. |
| 2008/0156528 A1 | 7/2008 | Campbell et al. |

* cited by examiner

SPLICE ASSEMBLY WITH SHIELD SOCK

CROSS REFERENCE TO RELATED APPLICATION

This application claims the benefit of U.S. Provisional Patent Application No. 61/150,047, filed Feb. 5, 2009, the disclosure of which is incorporated by reference herein in its entirety.

FIELD

This disclosure relates broadly to splices for electrical cables.

BACKGROUND

Electric cables are broadly employed in a variety of industries including power supply and generation. Some electrical cables distribute power across vast power grids or networks, moving electricity from power generation plants to the consumers of electrical power, and moving electricity from one power grid to another power grid. Other electrical cables are employed in wiring homes and/or businesses.

Electrical cables generally include a conductive core (typically copper or aluminum) and may include one or more layers of surrounding insulating material and one or more conductive or semiconductive layers. Some power cables include multiple twisted conductive wires. Electrical cables are constructed to carry high voltages (greater than about 50,000 volts), medium voltages (between about 1,000 volts and about 50,000 volts), or low voltages (less than about a 1,000 volts).

It is sometimes desirable to form a splice or a junction in the cable, for example, to electrically connect two or more electrical devices or to distribute electricity to additional branches of a power grid. Such branches may be further distributed until the grid reaches individual homes, businesses, offices. As one example, a single power cable supplying electrical power to a group of several buildings is commonly branched to each of the buildings. As used in this specification, the terms "splice" and "junction" are used interchangeably, and in each case refer to the portion of an electrical system where an incoming cable is connected to at least one outgoing cable.

SUMMARY

In one aspect, an assembly is provided that includes a tubular support core, a splice body having two ends and disposed upon the support core, a conductive shield sock comprising at least two overlapping layers and configured to circumferentially surround the splice body, and a cold shrink jacket having two ends and having an outside and an inside, configured to circumferentially surround the shield sock, and wherein the conductive shield sock extends beyond both ends of the splice body.

In another aspect, an article is provided that includes an apparatus and an assembly comprising a splice body having two ends, a longitudinal conductive shield sock comprising at least two overlapping layers and configured to circumferentially surround the splice body, and a tubular cold shrink jacket configured to circumferentially surround the shield sock, wherein the conductive shield sock extends beyond both ends of the splice body, and wherein the splice body, shield sock and cold shrink jacket collectively are configured to circumferentially surround the apparatus.

In yet another aspect, a method of forming an electrical splice is provided that includes forming an electrical splice comprising providing a first electrical cable having a first conductive core and a first metallic shield, providing an electrical splicing assembly comprising a support core; a splice body having two ends and configured to circumferentially surround the support core; a conductive shield sock comprising at least two overlapping layers, and configured to circumferentially surround the splice body; and a tubular cold shrink jacket configured to circumferentially surround the shield sock, inserting the first electrical cable through the tubular support core of the electrical splicing assembly, forming an electrical connection between the conductive core of the first electrical cable and a second conductive core of a second electrical cable having a second metallic shield, sliding the electrical splicing assembly over the electrical connection, collapsing or removing the support core to shrink the splice body over the electrical connection, and forming an electrical connection between the first metallic shield, the shield sock and the second metallic shield.

In some embodiments, a kit is provided that includes an assembly as described above and herein, clamps, and, optionally, a cold shrink short jacket.

The various embodiments of the provided assembly, article, method of forming an electrical splice, and kit provide advantages over the art in the following ways. First, with the shield sock essentially doubled from one end of the assembly to the other, it is possible to make the shield sock out of much thinner gauge wire and still carry more current than a single layer shield sock made with a thicker gauge wire. The thinner wire also allows formed splices to be much more flexible than those with thicker wire. Furthermore, the assembly includes a conductive shield sock having one or more sections, each of which section has two ends. The ends may be ragged or otherwise unfinished. When single layer socks are used, there are ragged, unfinished ends exposed on the outside of the assembly, which can interfere with making a splice. According to embodiments of the present invention, all of the ends of the one or more sections comprising the conductive shield sock are covered by the cold shrink jacket. Only a folded portion of a section comprising the conductive shield sock is exposed beyond the cold shrink jacket. This feature of the assembly facilitates forming the electrical connection between a metallic shield of an incoming electrical cable and the conductive shield sock because the exposed parts of the shield sock are folded portions rather than unfinished edges.

In this disclosure:
"apparatus" or, in the plural, "apparati" refer(s) to components involved in forming an electrical connection between two current carrying devices;
"assembly" refers to the components of a splice, not including the apparatus;
"circumferentially surround" refers to a condition in which a body at least partially encompasses another body wherein the original body is defined by a longitudinal axis and a wall that defines an exterior surface, and includes circular cylinders, non-circular cylinders, and hollow cylinders. The peripheral shape of a cross-section of the wall includes circular shapes, non-circular shapes, polygonal shapes, and other geometric shapes.

The above summary is not intended to describe each disclosed embodiment of every implementation of the present invention. The brief description of the drawing and the detailed description which follows more particularly exemplify illustrative embodiments.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope or spirit of the present invention. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

Figure 1:
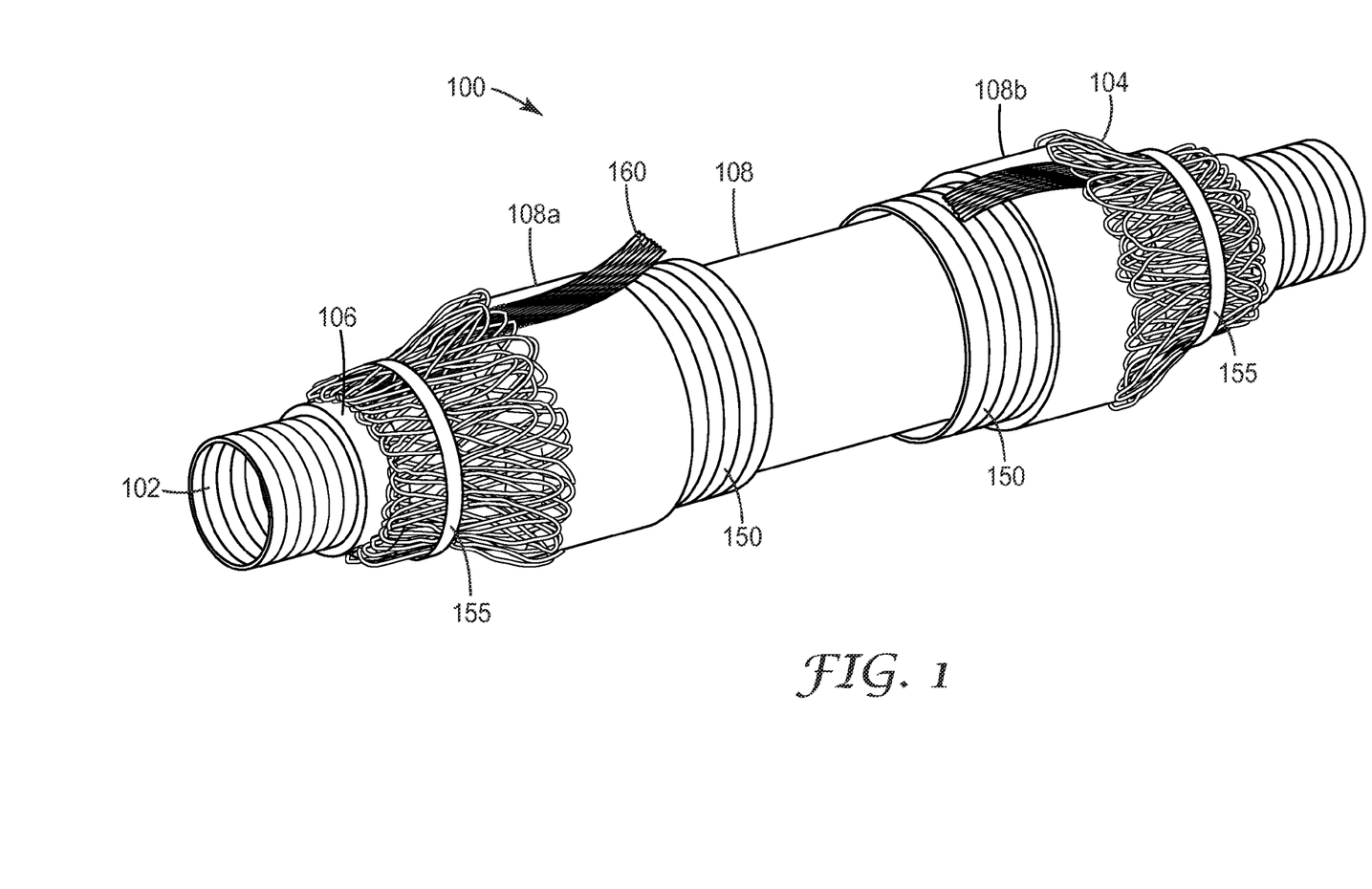
FIG. 1 is a drawing of an embodiment of an electrical cable splicing assembly.

FIG. 1 is a perspective drawing of an embodiment of the provided electrical cable splicing assembly. Cable splicing assembly 100 depicts an expanded or "pre-shrunk" cable splicing assembly that includes longitudinal tubular support core 102 that supports the expanded assembly during initial splicing steps. The support core may take any of several forms. Some embodiments of the support core include a removable support core. Examples of removable support cores can be found, for example, in PCT Publ. No. 95/11542 (Nakamura et al.), U.S. Pat. No. 3,515,798 (Sievert), U.S. Pat. No. 4,503,105 (Tomioka), U.S. Pat. No. 4,935,464 (Ona et al.), U.S. Pat. No. 5,087,492 (Vallauri et al.), U.S. Pat. No. 5,098,752 (Jong et al.), U.S. Pat. No. 5,495,650 (Crepel et al.), U.S. Pat. No. 5,577,310 (Cheenne-Astorino et al.), U.S. Pat. No. 5,747,744 (Kraft et al.), U.S. Pat. No. 5,756,936 (Viebranz et al.), and Eur. Pat. Appl. No. 0,500,216 (Tuggle). In other embodiments, the support core can be a spirally wound support core such as is described, for example, in U.S. Pat. No. 3,515,798 (Sievert), U.S. Pat. No. 4,389,440 (Keith), or U.S. Pat. No. 5,589,667 (Tzukazaki et al.). Alternatively, the support core can also include a crushable support core such as a frangible support that is not to be removed from the splice. The crushable support core shrinks in diameter in response to an operator crushing the frangible sections of the crushable support core, as understood by those skilled in the art. Examples of crushable cores can include a material that has a mesh pattern that is embedded with mastic, and the connections in the mesh of the crushable core can break responsive to compression by an operator, thereby causing the crushable core to shrink in diameter.

Cable splicing assembly 100 in FIG. 1 also includes longitudinal conductive shield sock 104 that is configured to circumferentially surround splice body 106. Shield sock 104 has ends (not shown), which are typically unfinished and ragged, that are located beneath tubular cold shrink jacket 108 between the cold shrink jacket 108 and the support core 102, more particularly between cold shrink jacket 108 and splice body 106, as shown. The cold shrink jacket 108 illustrated in FIG. 1 includes ends 108a and 108b that are folded back toward the center of the assembly and supported by separate support cores 150. For ease of installation, the exposed portion of shield sock 104 are folded back over ends 108a and 108b and secured with securing means 155, which may comprise tape, a rubber band, or any other suitable material. Cable splicing assembly 100 can optionally include ground braid 160. Ground braid 160 extends through cable splicing assembly 100 adjacent to shield sock 104 and extends beyond cold shrink jacket 108 after the splice has been completed. Ground braid 160 may be connected to an external ground wire or cable. Ground braid 160 may be a metal braid material or any other material suitable for use as a grounding means.

All of the embodiments of the provided assembly include a tubular cold shrink jacket. The cold shrink jacket is made of cold shrinkable material. The cold shrink jacket may comprise one or more overlapping or abutting sheets of cold shrink material. Cold shrinkable material, as generally understood by persons having ordinary skill in the art, can be any material of tubular character that is capable of being held in an expanded state by a support structure and which shrinks in diameter when the support structure is removed from the cold shrinkable material. For example, the cold shrinkable material can be made from a rubber material, a thermoplastic elastomer, or other suitable material demonstrating cold shrink properties (such as being capable of elongation greater than 100% and permanent set less than 30%), as understood by those skilled in the art. Examples of suitable rubber materials include, but are not limited to, silicone rubber, EPDM (ethylene-propylene-diene copolymer), polyisoprene, styrene-butadiene rubber, polychloroprene, butyl rubber, acrylonitrile-butadiene (NBR) rubber, hydrogenated acrylonitrile-butadiene rubber, acrylic rubber, ethylene acrylic rubber, rubber material having fluoroelastomer fillers, or rubber material having epichlorohydrin fillers. Examples of suitable thermoplastic elastomers include, but are not limited to, plastic materials, fluoroelastomers, epichlorohydrins, olefin thermoplastic elastomers, styrene thermoplastic elastomers such as SBS (styrene-butadiene block copolymers), and SEBS (styrene-ethylene butylene-styrene copolymers). In order to improve the properties of the cold shrinkable material, various additives, agents, and/or fillers may be included such as, for example, coloring agents, flame retardants, lubricants, processing aides, fillers, softening agents, antistatic agents, crosslinking agents, crosslinking aides in proper amounts. Embodiments of the cold shrinkable material can exhibit desirable characteristics of good tear strength, heat resistance, fluid resistance, transparency, and other features as understood by those skilled in the art. The cold shrinkable material, when in a relaxed state before installation, typically has an inner diameter that is less than the outer diameter of the splice body and the support core and also that is less than or substantially equal to at least a portion of the electrical splice to which it is to be applied, as understood by those skilled in the art. Examples and descriptions of cold shrinkable materials useful in the provided articles can be found, for example, in U.S. Pat. No. 5,365,020 (Vallauri et al.) and U.S. Pat. No. 6,838,512 (Eggers et al.), and U.S. Pat. Publ. No. 2008/0135288 (Taylor et al.), and U.S. Ser. No. 11/961,361 (Janulis et al.) filed Dec. 20, 2007.

Figure 2A:
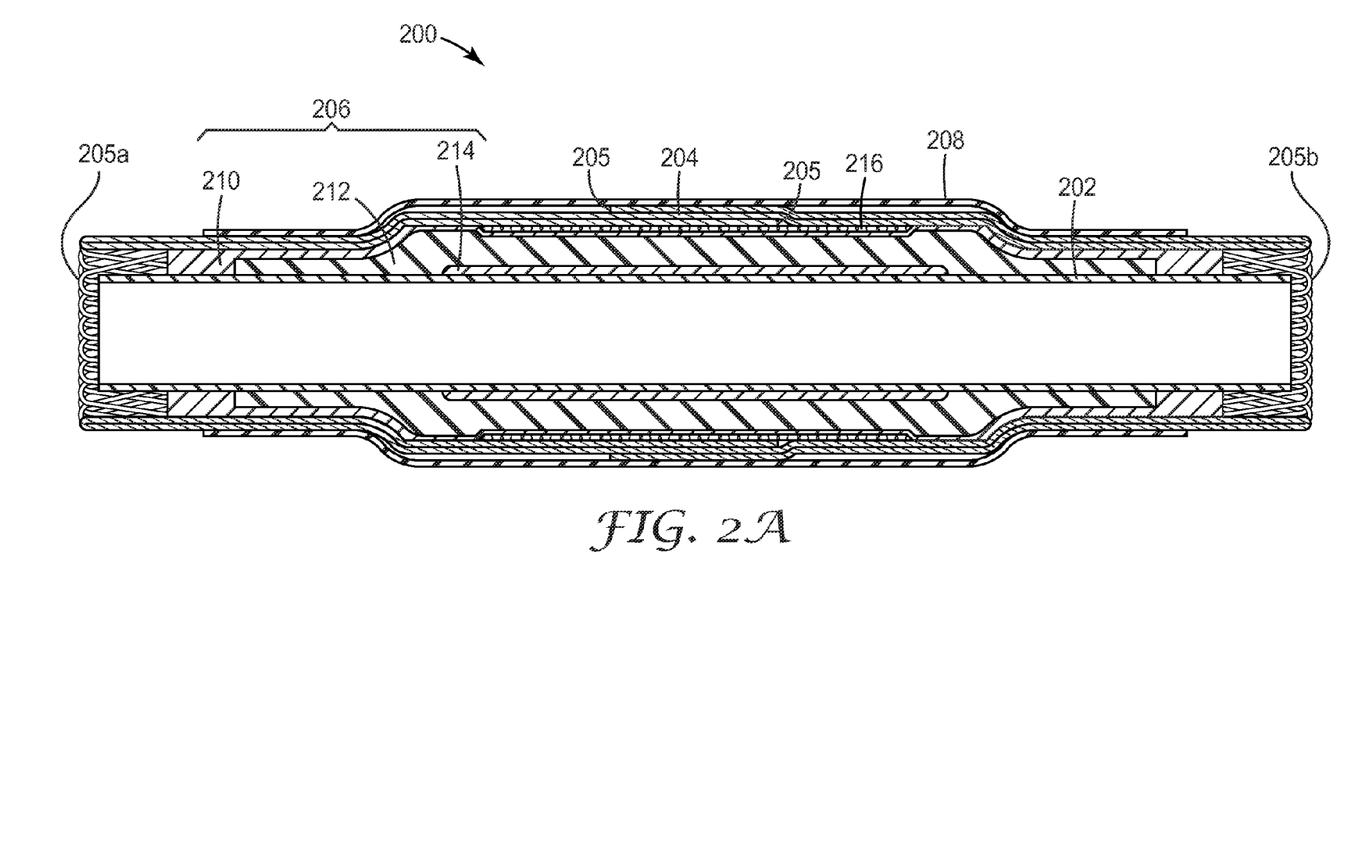
FIG. 2A is a cross-sectional drawing of an embodiment of an electrical cable splicing assembly.

FIG. 2A is a cross-sectional drawing of an embodiment of a cable splice assembly of the present invention. Cable splice assembly 200 includes tubular support core 202 defining a hollow tube through which one or more electric cables (not shown) can be inserted before splicing. Circumferentially surrounding the support core is splice body 206 that, in the illustrated embodiment, actually has at least three components—a semiconducting layer 210, insulative layer 212, and second semiconducting layer 214. The splice body 206 can be surrounded, for at least part of its longitudinal length, with a protective wrap 216. The splice body can be made from polymers, typically, rubbers, such as ethylene propylene diene rubbers and silicone rubbers, epoxies, epichlorohydrins, fluoroelastomers, and combinations thereof.

FIG. 2A also illustrates features of shield sock 204. Shield sock 204 is located between expanded cold shrink jacket 208 and splice body 206. In this embodiment, shield sock 204 is made of a conductive continuous wire mesh, screen, or braid material that, when unfolded, is longer than twice the longitudinal length of the splice body 206 (collectively 210, 212, and 214) and the expanded cold shrink jacket 208. Typically, the double layer shield sock is designed to carry between about 16% and about 100% of the current of the conductive cores of the cables connected by the splice. The ends of the material from which the shield sock is made are typically unfinished and ragged—that is they have exposed wire edges such as those that are obtained when a wire screen is cut. In embodiments of the provided assembly, the shield sock has edges that are located underneath the expanded tubular cold shrink jacket.

In some embodiments of the present invention, the conductive shield sock does not form a completely overlapping layer such that at least a double layer over the entire length of the splice body is formed, but instead may form a partially overlapping layer such that a double layer is formed over less than about 50% of the splice body, may form a substantially overlapping layer such that a double layer is formed over about 50% and up to about 100% of the splice body, or may form a completely overlapping double layer such that a double layer is formed over 100% or more of the splice body. In preferred embodiments, all ends of any shield sock sections overlap each other so that complete overlapping is achieved and there are at least two layers of conductive material along the entire length of the completed splice. In FIG. 2A, shield sock 204 has two ends 205 underneath expanded tubular cold shrink jacket 208 and two folds 205a and 205b that extend out beyond tubular cold shrink jacket 208.

Figure 2B:
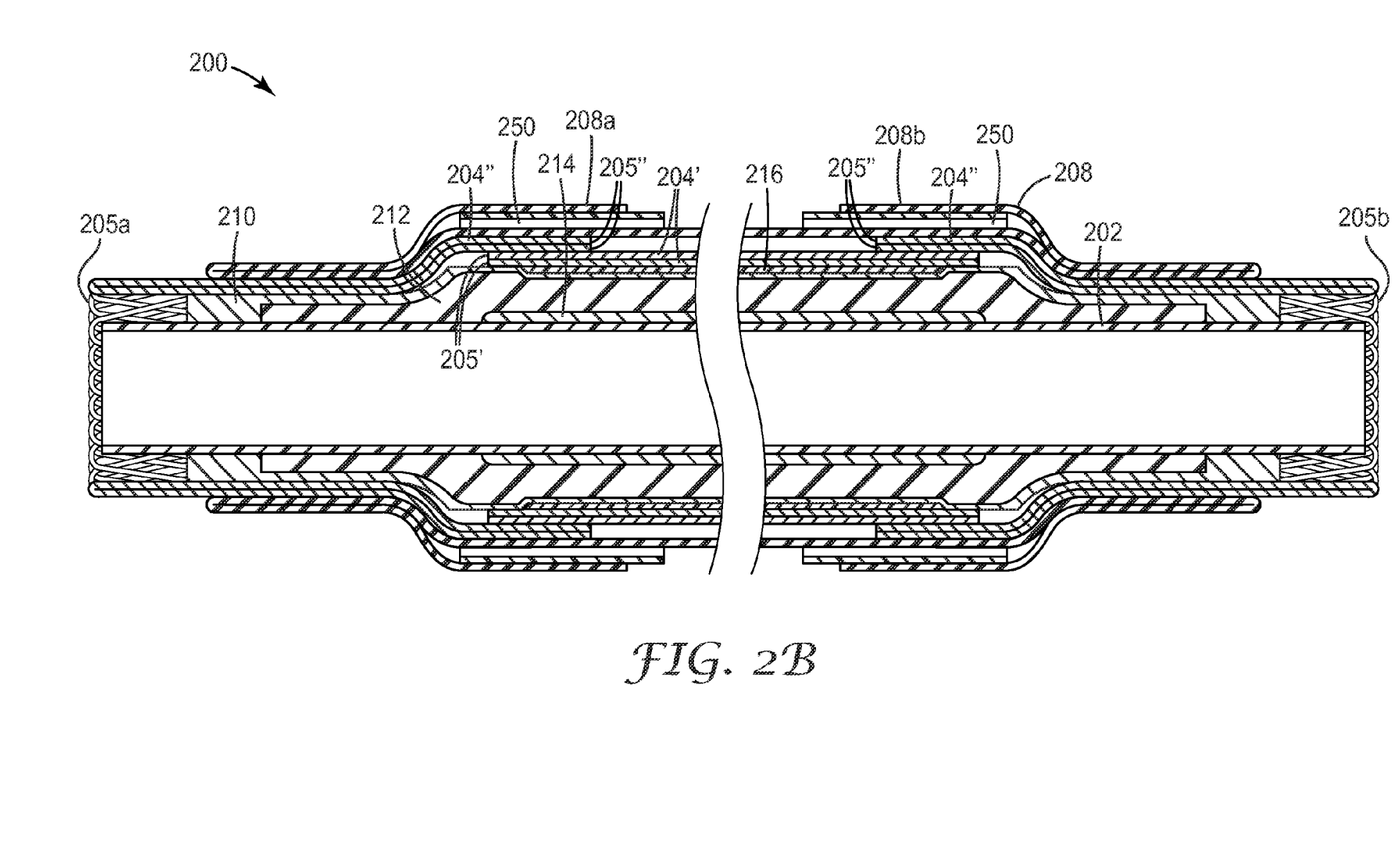
FIG. 2B is a cross-sectional drawing of another embodiment of an electrical splicing assembly.

FIG. 2B shows an assembly similar to that in FIG. 2A, but having an alternate embodiment of a conductive shield sock comprising two flat shield sock sections 204', both located circumferentially around the splice body, and two folded shield sock sections 204", each located around an end of the splice body. The ends of flat shield sock sections 204' and the ends of folded shield sock sections 204" overlap each other so that at two locations in the assembly, there are four layers of shield sock material. As with the embodiment of FIG. 2A, no ends of the shield sock sections extend outward beyond the splice body and expanded cold shrink jacket 208; instead, only folds 205a, 205b extend beyond the splice body 206 and cold shrink jacket 208. The cold shrink jacket 208 of FIG. 2B shows a cross-sectional representation of a folded back cold shrink jacket, as illustrated in FIG. 1. Ends 208a and 208b are each supported by a support core 250.

Other embodiments of a conductive shield sock are also suitable for this invention. Typically complete overlap is preferred, but there may be instances in which only partial or substantial overlap is preferred. In one embodiment of a partial or substantial overlap construction, the conductive shield sock may be a single piece of material that has two folded portions extending beyond the splice body but is shorter than the conductive shield sock shown in FIG. 2A so that its two ends do not overlap. In such an embodiment, a portion of the splice body would be covered by only a single layer of the conductive shield sock. This embodiment could be modified with the addition of a flat shield sock section (such as 204' shown in FIG. 2B) to achieve complete overlap and, therefore, at least a double layer over the entire length of the splice body. As another example, in a partial or substantial overlap construction, the conductive shield sock may be made of three sections, similar to the embodiment shown in FIG. 2B, but with one of the flat shield sock layers 204' removed.

One advantage of the conductive shield sock of the present invention is that it has no exposed ragged edges, which facilitates handling in field applications. Additionally, in embodiments of cable splicing assemblies having the overlapping shield sock layers described herein, thinner gauge wire mesh can be used to make the shield sock. Suitable gauges for the individual strands of the wire mesh typically range from about 24 AWG to about 36 AWG. This can provide a splice which is more flexible and bendable than the current state of the art. Additionally, the double layer shield sock can provide the same, or better, current carrying capacity (ampacity) as traditional splices, which typically have shield socks made of a single layer of thick gauge wire mesh. The double layer sock can provide ampacity up to about ⅓ neutral on a 750 Aluminum conductor cable. It can provide up to about 156,340 circular mil area of copper.

Figure 3:
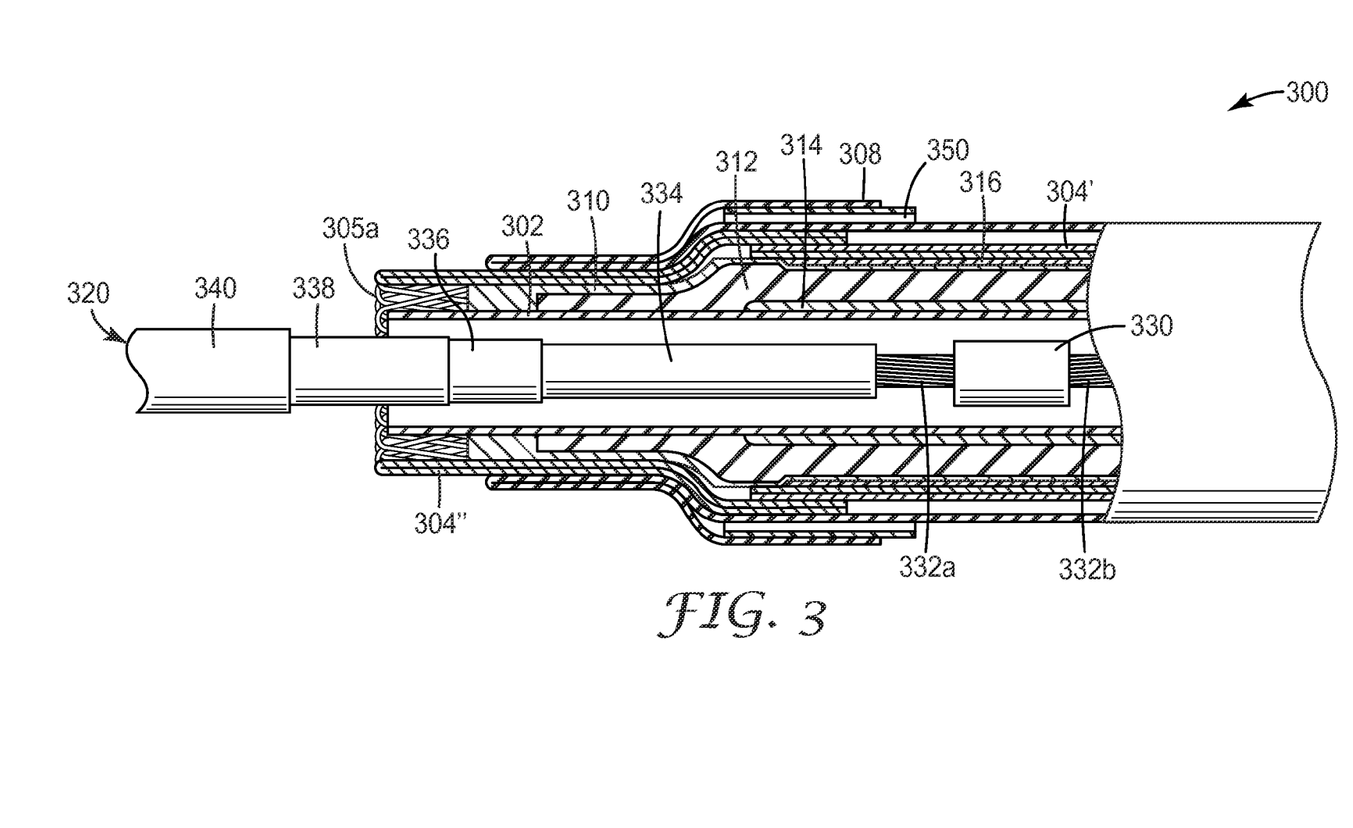
FIG. 3 is a cross-sectional cut-away view of an embodiment of the electrical cable splicing assembly with two electrical cables having joined core connectors located within the assembly.
Figure 4:
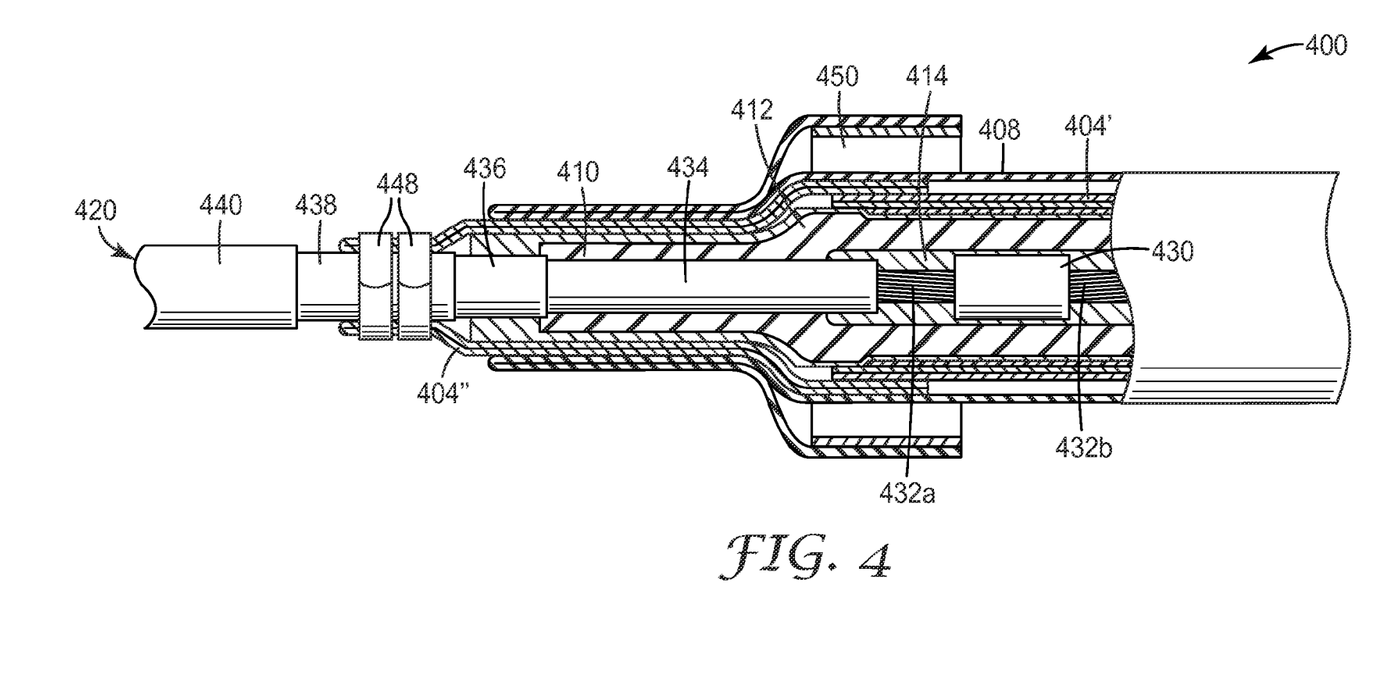
FIG. 4 is a cross-sectional cut-away view of an embodiment of a partially finished electrical cable splice.

An embodiment of a provided article, in this embodiment an electrical cable splice, is shown in FIGS. 3 and 4. FIG. 3 shows electrical cable splice 300 that includes an assembly and an apparatus (in this embodiment, electrical cables joined using a connector inside of the expanded assembly). The assembly includes tubular support core 302 defining a hollow tube in which the first conductive core 332a of first electrical cable 320 and the second conductive core of the second electrical cable (only conductive core 332b of the second electrical cable is shown) are joined by connector 330. The assembly also includes a splice body (layers 310, 312, and 314 in FIG. 3), conductive shield sock sections 304' and 304", and cold shrink jacket 308 and support core(s) 350. Connector 330 can be any connector used for physically and electrically joining two or more electrically conductive cores, such as a crimped connector or a shear bolt. Typically, the connector is made of aluminum, copper, or an alloy of aluminum/copper. Each wire or cable to be connected is inserted into the connector and then the connector is secured to the cable to complete the connection. Connectors useful in articles of this disclosure are well known by those skilled in the art. Circumferentially surrounding the support core is a splice body that, in the illustrated embodiment, actually has at least three components—a semiconducting layer 310, insulative layer 312, and second semiconducting layer 314. The splice body is surrounded, for at least part of its longitudinal length, with protective wrap 316. Constituents of the first electrical cable 320 are illustrated in FIG. 3 and include conductive core 332a, core insulation 334, semiconductive layer 336, metallic shield 338, and cable jacket 340. First electrical cable 320 is positioned within the assembly so that upon removal of support core 302, shield sock section 304", which includes fold 305a, can make contact with metallic shield 338 of the first electrical cable.

FIG. 4 is a cross-sectional view of assembly 400 which is the same assembly as 300 except that in FIG. 4, the inner support core has been removed and cold shrink jacket 408 has been allowed to relax (except for the ends supported by support core 450) and cause the splice body to fit snugly over the joined conductive cores of the cables. FIG. 4 shows an apparatus that comprises connector 430 that joins conductive core 432a of first electrical cable 420 with conductive core 432b of second electrical cable (only conductive core shown in illustration). Assembly 400 is now in its (substantially) relaxed state and includes the splice body (including semiconducting layer 410, insulative layer 412, and second semiconducting layer 414) snugly positioned around core insulation 434 and the joined cables. In FIG. 4, shield sock section 404" has been made to electrically contact first metallic shield 438 of first electrical cable 420. The electrical connection is secured by the use of one or more of clamp(s) 448, which may be a constant force spring, thus first metallic shield 438 of first cable 420 is now in electrical contact with metal shield sock 404 and (the other end is the same) also in electrical contact with the metallic shield 438 of the second electrical cable. Semiconductive layer 436 and cable jacket 440 are shown on first electrical cable 420.

Provided electrical splice connectors can be configured to electrically connect conductors/wires having a wide range of conductor sizes. In one embodiment, an electrical splice connector is provided that electrically connects medium and high voltage conductors, such as medium voltage wires (cables) having a size ranging from 2 gauge to 2500 kcmil or larger. Some embodiments provide an electrical splice connector suited for electrically connecting telecom, automotive, or industrial-sized conductors. When the electrical cables conduct medium voltages then the metallic shields and the shield sock of the provided splice can provide a conduit for the return flow of current that is conducted through the conductive cores of the cables. In some medium and high voltage connections, a second core can be present for return flow and the conductive pathway provided through the connected metallic shields and the shield sock of the provided splice can be used for grounding only.

Figure 5A:
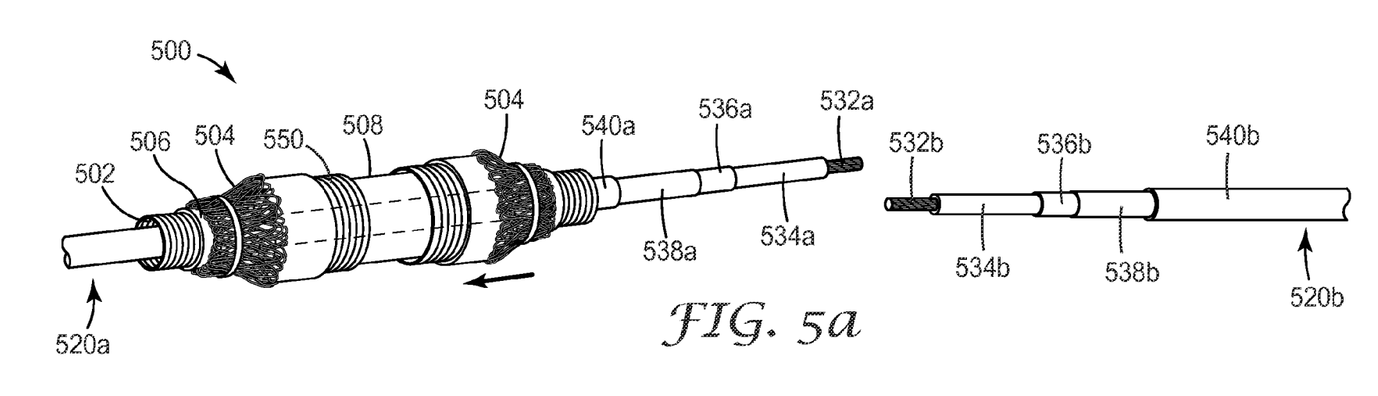
FIGS. 5a-5e illustrate steps in an embodiment of a method of forming an electrical cable splice.
Figure 5B:
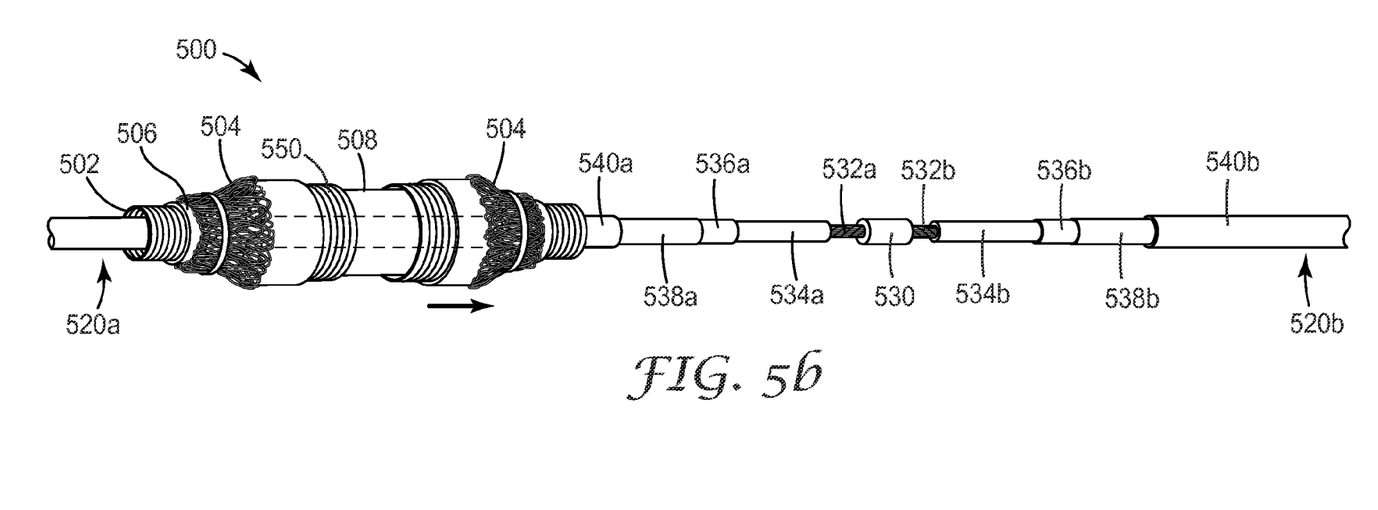
Figure 5C:
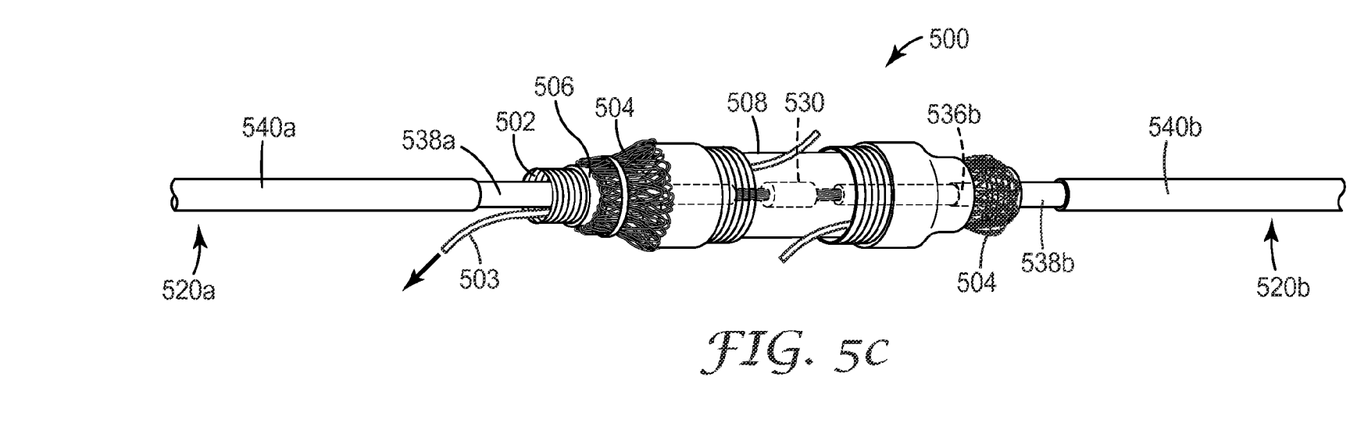
Figure 5D:
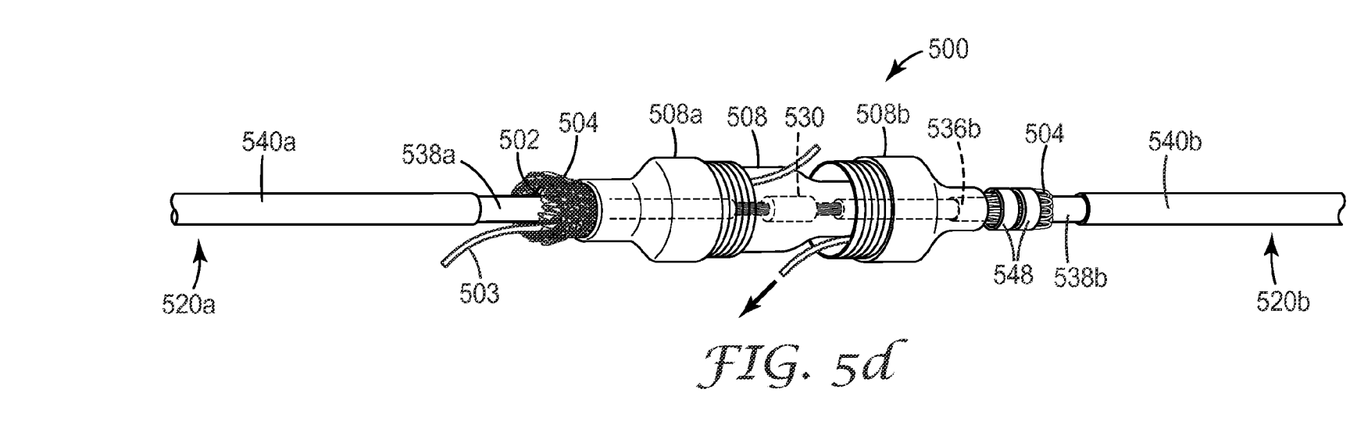
Figure 5E:
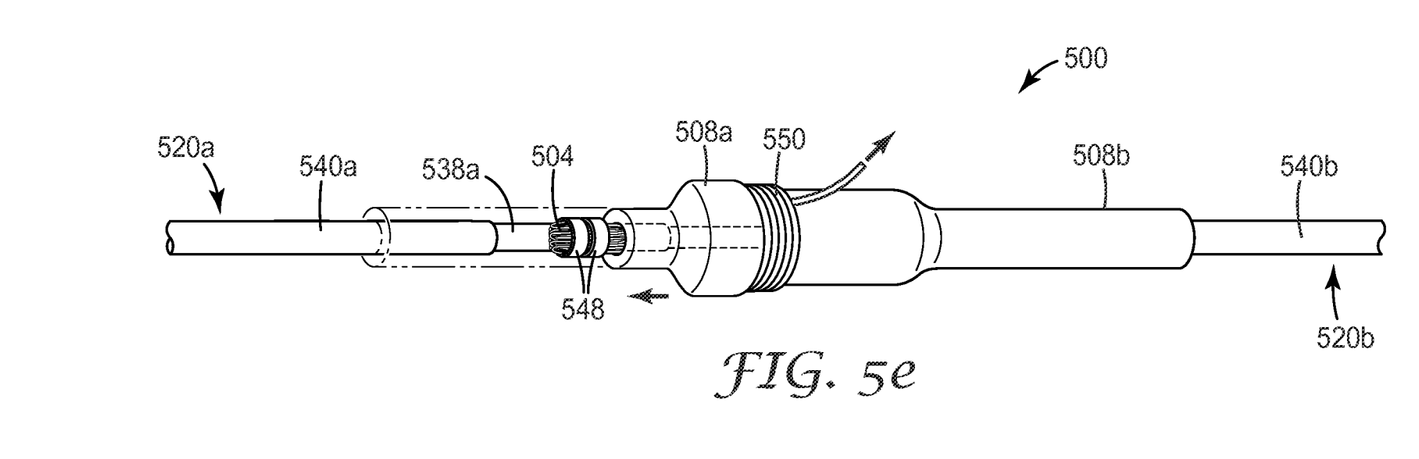

Also provided is a method of forming an electrical splice. An embodiment of this method is illustrated in the series FIGS. 5a-5e. The illustrated method includes providing first electrical cable 520a having first conductive core 532a and first metallic shield 538a. First electrical cable 520a also includes core insulator 534a, semiconductor layer 536a and cable jacket 540a. Also provided is electrical splicing assembly 500 that includes a support core 502, splice body 506, shield sock 504, cold shrink jacket 508, and support cores 550. The shield sock 504 has ends (not visible) that are located between cold shrink jacket 508 and the splice body 506. In FIG. 5a first electric cable 520a has been inserted through support core 502 of assembly 500. Assembly 500 has been moved in the direction of the arrow onto first electric cable 520a and away from the end to be spliced. In FIG. 5b electrical connector 530 is placed on conductive core 532a of first electrical cable 520a and conductive core 532b of second electrical cable 520b to establish an electrical connection. Electrical splicing assembly 500 is then moved in the direction of the arrow in FIG. 5b into a position so as to cover electrical connector 530 resulting in the position of the assembly and the connector shown in FIG. 5c. In FIG. 5c, shield sock 504 is now substantially aligned over first metallic shield 538a of first electrical cable 520a on the left side of the assembly and over second metallic shield 538b of second electrical cable 520b on the right side of the assembly. Semiconducting layer 536b of second electrical cable 520b and connector 530 are shown in hidden view inside of the assembly in FIG. 5c. In this embodiment, support core 502 is a spirally wound support core, one end 503 of which is protruding from the assembly in FIG. 5c. End 503 of support core 502 will be unwound, typically counterclockwise, and pulled in the direction of the arrow to collapse splice body 506 and the interior portion of cold shrink jacket 508 onto the spliced cables. In FIG. 5d, clamps 548, which may be constant force springs, have been used to form an electrical connection between shield sock 504 and second metallic shield 538b. End 503 of the support core has been partially pulled out thereby collapsing a portion of the splice body 506, the shield sock 504 and an interior portion of the cold shrink jacket 508 onto second electrical cable 520b. As illustrated in FIG. 5e, after the support core 502 is completely removed, clamps 548 are used to form an electrical connection between the first metallic shield 538a of first electrical cable 520a and shield sock 504. As further illustrated in FIG. 5e, the support core 550 supporting cold shrink jacket end 508b has been removed and end 508b has been unfolded to fully cover shield sock 504, clamps 548, and a portion of cable jacket 540b. To complete the splice, the remaining support core 550 will be removed and cold shrink jacket end 508a will be unfolded to fully cover shield sock 504, clamps 548, and a portion of cable jacket 540a. Typically grease is applied under the folded back ends 508a and 508b so they can be more easily unfolded. For embodiments having a cold shrink jacket such as illustrated in FIG. 2A, which does not have folded back ends (e.g., 108a and 108b) separate short cold shrink jackets (having their own support cores) may additionally be used. The cold shrink jacket of FIG. 2A would leave portions of the shield sock 204 exposed after the splice is completed. In such an embodiment, a cold shrink short jacket (not shown) can be positioned over the portion of shield sock 204 extending beyond cold shrink jacket 208. The cold shrink short jacket can be used to cover all of the exposed conductive parts of a splice after the splice is made and after the cold shrink jacket has been relaxed or shrunk. For example, it can be collapsed to cover a portion of cold shrink jacket 208, the exposed portion of shield sock 204, any clamps used, and a portion of the cable jacket of the cable being spliced. The cold shrink short jacket can be made of the same materials as the cold shrink jacket of the assembly. Typically, the cold shrink short jacket with support core is threaded onto the electrical cable before the splice is made. It is then moved over the exposed conductive parts of the splice that include the one or more clamps. The support core of the cold shrink short jacket is removed and the short jacket contracts or shrinks to complete the splice and in this way provides an environmental seal over all the conductive parts of the splice.

Additionally, a kit is provided that includes an assembly as described above. In addition to the assembly, the kit includes at least one clamp, typically two clamps, for each side of the splice, and optionally, depending on the type of cold shrink jacket used, a cold shrink short jacket.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows. All of the references cited within this disclosure are hereby incorporated by reference in their entirety.

What is claimed is:

1. An assembly comprising:
   a tubular support core;
   a splice body having two ends and disposed upon the support core;

a conductive shield sock, comprising at least two overlapping layers, and configured to circumferentially surround the splice body; and, a cold shrink jacket configured to circumferentially surround the shield sock, wherein the conductive shield sock comprises at least one folded section having two discrete ends and a bend wherein the bend of the folded section extends beyond one end of the splice body.

2. An assembly according to claim 1, wherein the two discrete ends of the at least one folded section of the conductive shield sock are located between the cold shrink jacket and the splice.

3. An assembly according to claim 1, wherein a single section of the conductive shield sock comprises two bends, and wherein one bend extends beyond one end of the splice body and the other bend extends beyond the other end of the splice body.

4. An assembly according to claim 1, wherein the shield sock comprises a metallic mesh.

5. An assembly according to claim 1, further comprising a ground braid located adjacent the conductive shield sock between the cold shrink jacket and the splice body and extending beyond both ends of the splice body.

6. An assembly according to claim 1, wherein the ends of the cold shrink jacket comprises folded portions.

7. An article comprising:
an apparatus; and
an assembly comprising:
  a splice body having two ends,
  a longitudinal conductive shield sock comprising at least one section folded to form at least two overlapping layers and configured to circumferentially surround the splice body, and,
  a tubular cold shrink jacket configured to circumferentially surround the shield sock,
  wherein the at least one folded section of the conductive shield sock comprises two discrete ends and a bend that extends beyond one end of the splice body,
  wherein the splice body, shield sock and cold shrink jacket collectively are configured to circumferentially surround the apparatus.

8. An article according to claim 7 wherein the conductive shield sock comprises one or more sections, each section having two discrete ends, and wherein all of the section ends are located between the cold shrink jacket and the splice body.

9. An article according to claim 8 wherein a single section of the conductive shield sock comprises two bends, and wherein one bend extends beyond one end of the splice body and the other bend extends beyond the other end of the splice body.

10. An article according to claim 7, wherein the apparatus comprises a first electrical cable having a first conductive core comprising a first metallic shield and a second electrical cable comprising a second metallic shield, wherein the first conductive core is in electrical contact with the second conductive core, and wherein the first metallic shield is in electrical contact with the shield sock which is also in electrical contact with the second metallic shield.

11. An article according to claim 10, further comprising at least one clamp positioned over the shield sock and compressing the shield sock against the first or the second metallic shield.

12. An article according to claim 7 further comprising a ground braid located adjacent the conductive shield sock between the cold shrink jacket and the splice body and extending beyond both ends of the splice body.

13. An article according to claim 7 wherein the ends of the cold shrink jacket comprise folded portions.

14. An assembly according to claim 1, wherein the bend of the folded section is folded back over the cold shrink jacket.

15. An article according to claim 7, wherein the bend of the folded section is folded back over the cold shrink jacket.

* * * * *